United States Patent [19]
Ferguson

[11] 3,861,431
[45] Jan. 21, 1975

[54] AIR TRAVEL ALCOHOLIC BEVERAGE DISPENSER

[76] Inventor: Scott M. Ferguson, 4801 Vernon St., Long Beach, Calif. 90815

[22] Filed: July 30, 1973

[21] Appl. No.: 383,664

[52] U.S. Cl. .............................................. 141/364
[51] Int. Cl. ............................................... B65b 1/06
[58] Field of Search ........... 141/351, 363, 364, 365, 141/366, 312, 345, 311, 372; 222/514, 510

[56] References Cited
UNITED STATES PATENTS

| 113,786 | 4/1871 | Mumler | 141/345 X |
|---|---|---|---|
| 1,342,569 | 6/1920 | Pick | 141/365 X |
| 1,359,730 | 11/1920 | Norton | 141/345 X |
| 3,256,916 | 6/1966 | Silletti | 141/366 X |

*Primary Examiner*—Stanley H. Tollberg

[57] ABSTRACT

A container-dispenser for an alcoholic beverage suitable for use as the cover of a glass. The container-dispenser has a peripheral flange engageable with the rim of a glass containing ice and a liquid mixer. The container-dispenser comprises a hollow body on which the peripheral flange is formed, and a tubular valve. The tubular valve extends through the hollow body, fitting a central opening in the bottom of the hollow body and a central internal tubular extension of the top of the hollow body. When an alcoholic beverage contained in the container-dispenser is to be dispensed into the glass, the tubular valve is depressed so that side ports of the valve are uncovered by the internal tubular extension in the hollow body, and the alcoholic beverage flows therefrom into the glass by way of the uncovered side ports and the interior of the valve.

4 Claims, 5 Drawing Figures

PATENTED JAN 21 1975  3,861,431
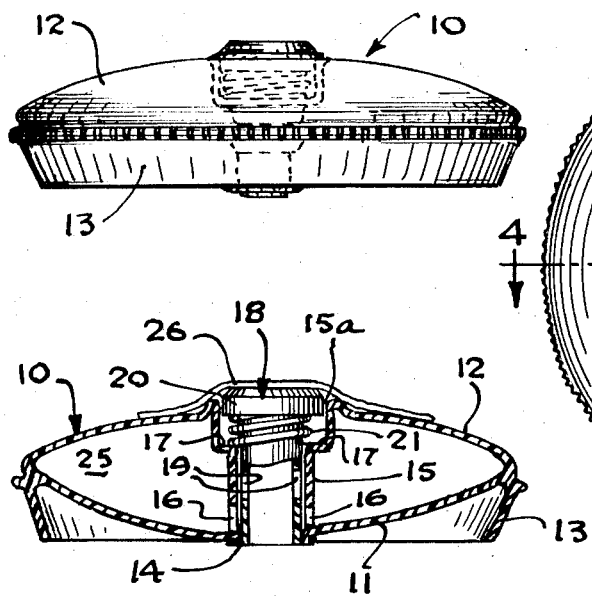
FIG.1
FIG.3
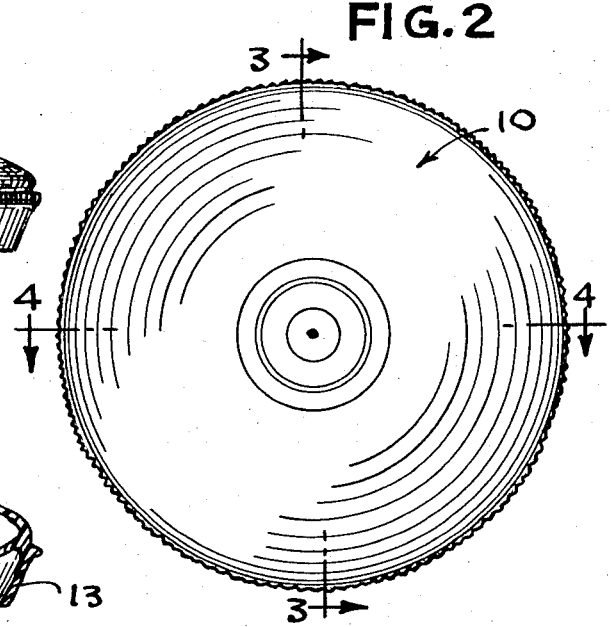
FIG.2
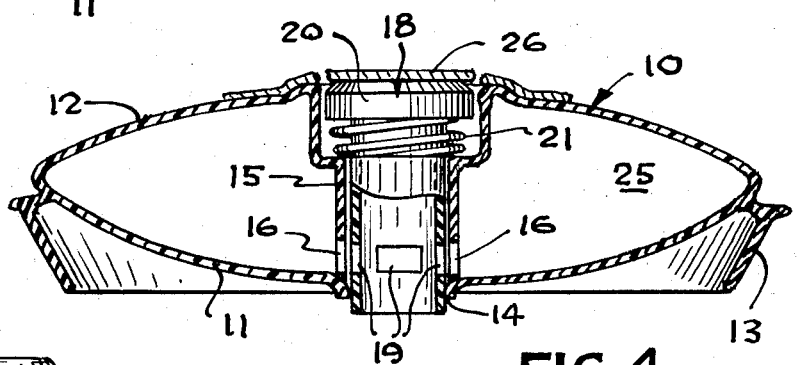
FIG.4
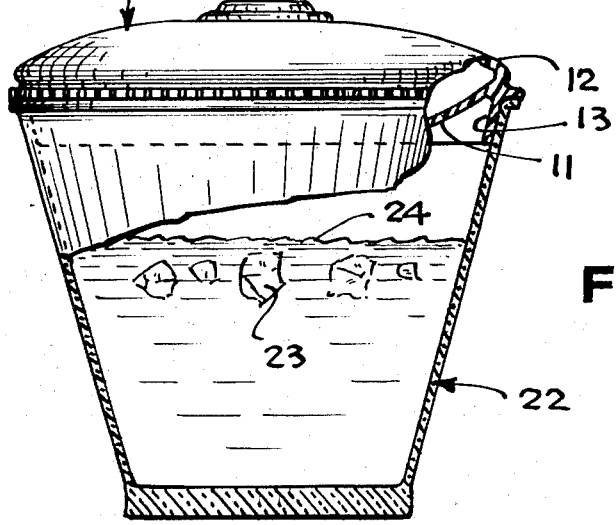
FIG.5

AIR TRAVEL ALCOHOLIC BEVERAGE DISPENSER

This invention relates to a container-dispenser for an alcoholic beverage. More specifically, the invention relates to a container for a small amount of alcoholic beverage such as a tenth of a pint to be dispensed during travel on an airplane, train, or boat.

In airplanes or trains, alcoholic beverages in small bottles and glasses or tumblers containing ice and possibly a mixing beverage are brought to the passengers. It frequently happens that water, ice, or mixing beverage spills out of the glasses, because of crowding in the airplane or a bumpy ride on the plane or train.

I have invented a container-dispenser that serves as a cover for the drink glass containing ice and possibly a mixing beverage and from which the alcoholic beverage may be easily and readily released into the glass.

In the drawings:

FIG. 1 is an elevational view of the container-dispenser of the present invention;

FIG. 2 is a plan view of the container-dispenser;

FIG. 3 is a vertical sectional view taken on the line 3—3 of FIG. 2;

FIG. 4 is a vertical sectional view taken on the line 4—4 of FIG. 2; and

FIG. 5 is an elevational view, partly in section, showing the container-dispenser and a drink glass on which the container-dispenser serves as a cover.

The reference character 10 designates the container-dispenser of the present invention. As seen in FIGS. 1, 3, and 4, the container-dispenser 10 comprises a hollow body formed of clear plastic such as polyurethane or polyethylene, having a bottom 11, a top 12 joined to the bottom at the periphery, and a peripheral flange 13 located adjacent the juncture of the top and bottom and having the shape of the frustum of a cone. The bottom 11 has a central opening 14. A hollow cylindrical tubular extension 15 integral with the top 12 and the bottom 11 extends between opening 14 of the bottom and the top 12, the tube or extension 15 engaging the bottom 11 around the central opening 14 therein. The tube 15 forms a circular opening 15a in the top 12, and hence a passageway through the dispenser. The tubular extension 15 has at its end adjacent the bottom 11 a pair of opposed ports 16. The end of the tubular extension 15 adjacent the top 12 is enlarged so as to present a shoulder 17 facing upwardly and away from the bottom 11.

The container-dispenser 10 further comprises a hollow cylindrical sleeve or valve 18 preferably formed of clear plastic such as polyurethane or polyethylene. The valve 18 is provided with a pair of opposed ports 19 and an enlarged head 20. The valve 18 is snuggly disposed within the tubular extension 15 and forms a liquid seal therewith except when the ports 19 of the valve are aligned with the ports 16 of the tubular extension 15. A spring 21 acting between the head 20 of the valve 18 and the shoulder 17 of the tubular extension 15 keeps the valve sufficiently elevated as to maintain the ports 19 of the valve 18 out of registry with the ports 16 of the extension 15.

As shown in FIG. 5, the container-dispenser 10 serves as a cover for a drink glass 22 containing ice cubes 23 and a mixing beverage 24. The drink glass 22 may be formed of glass or a clear plastic and is shaped like the frustum of a cone. The rim of the glass 22 is engaged and sealed interiorly by the peripheral flange 13 of the container-dispenser 10.

When the stewardess serves an airplane or train passenger, she brings him the drink glass 22 and the container-dispenser 10 assembled as shown in FIG. 5, so that the ice cubes 23 and mixing beverage 24 are prevented from spilling out of the drink glass 22 by the container-dispenser 10 serving as a cover to the drink glass.

When alcoholic beverage in the container-dispenser 10 is to be transferred to the drink glass 22, the valve 18 is lowered by pressure applied to the head 20 thereof to bring the ports 19 in the valve 18 into registry with the ports 16 in the tubular extension 15, whereupon the alcoholic beverage 25 flows from the container-dispenser 10 to the drink glass 22 by way of the ports 16 and 19, and the interior of the valve 18. All or a portion of the alcoholic beverage 25 in the container-dispenser 10 may be transferred to the drink glass 22, depending on how long the valve 18 is depressed. When all of or the desired portion of the alcoholic beverage originally contained in the container-dispenser 10 has been transferred to the drink glass 22, the valve 18 is released and is returned by the spring 21 to its original position, in which the valve ports 16 are closed and sealed by the tubular valve 18. The undispensed portion of the alcoholic beverage, if any, remains in the container-dispenser 10, the dispenser is removed from the drink glass 22, and the passenger may drink from the glass.

A government revenue stamp may be affixed on the top 12 of the container-dispenser 10 across the upper end of the valve 18. The stamp, illustrated at 26, is perforated by depressing the tubular valve 18. The container-dispenser is thrown away after a single use.

The container-dispenser 10 of the present invention may find its greatest use in airplanes because of the frequency of their use, but it is to be understood that the container-dispenser 10 may also be used to good advantage on railroad trains or boats, where, though space is not a problem, lurching of the train or boat may easily spill ice or mixing beverage from the drink glass. Further, the dispensers may be readily stored in a carton, or dispenser, to facilitate serving of a drink.

Those skilled in the art will readily utilize the teachings of the foregoing invention in ways in addition to and beyond those here described, and it is therefore intended that the scope of the present invention be limited not by the foregoing disclosure, but rather only by the appended claims.

The invention claimed is:

1. A container-dispenser for an alcoholic beverage, comprising a hollow fluid tight body adapted to contain a body of an alcoholic drink provided with a bottom having a central opening, a top having a central internal tubular protrusion aligned with and extending toward the central opening in the bottom, the top and bottom being joined at their peripheries, the body having adjacent the juncture of the top and bottom a peripheral depending flange tapering inwardly, said flange being adapted to engage the surface of the rim of a drink glass, the hollow body being thereby enabled to serve as a cover for the drink glass, and a hollow valve slidably fitting the tubular protrusion and the central opening in the base and having a side port normally covered and sealed against liquid flow by the tubular protrusion, translation of the valve causing the port therein to be uncovered by the tubular protrusion, thus permitting the alcoholic drink within the hollow body to flow from the hollow body into the drink glass by way of the port and interior of the valve.

2. A container-dispenser as specified in claim 1, the valve having an enlarged head on the end away from the bottom of the hollow body, the container-dispenser further comprising a spring acting against the enlarged head of the valve to maintain the latter in a position in which the side port of the valve are covered by the tubular protrusion of the top of the hollow body.

3. A container-dispenser as specified in claim 2, the tubular protrusion having an internal shoulder facing away from the bottom of the hollow body, the spring acting between said internal shoulder and the enlarged head of the valve.

4. For use as a cover for a glass shaped like the frustum of a cone and adapted to contain ice and a liquid mixer: a container-dispenser for an alcoholic beverage, comprising 1. a hollow body of clear plastic comprising (a) a peripheral conical flange adapted to engage the interior of the open end of the glass, (b) a bottom having a first central opening, and (c) a top having a second central opening and an internal sleeve-like extension depending from the second central opening and engaging the bottom around the first central opening therein, the top being joined to the bottom adjacent the peripheral flange and being elsewhere spaced from the bottom, except at the sleeve-like extension, the sleeve-like extension having a shoulder spaced from and facing away from the bottom and a port located between the shoulder and the bottom, 2. a hollow valve having one end fitting the central opening in the bottom and intermediate regions fitting the portion of the sleeve-like extension between the shoulder and the bottom, the hollow valve also having a side port and an enlarged head on the end away from the bottom of the hollow body, and 3. a spring acting between the head on the hollow valve and the shoulder on the sleeve-like extension so as to keep the ports in the hollow valve out of registry with the ports in the sleeve-like extension, whereby pressure applied to the head of the hollow valve moves the head toward the shoulder on the sleeve-like extension against the action of the spring and brings the port on the hollow valve into registry with the port in the sleeve-like extension, thus causing the alcoholic beverage to escape from the container-dispenser into the glass by way of the registered ports and the interior of the hollow valve.

* * * * *